(12) United States Patent
Bao et al.

(10) Patent No.: US 12,464,589 B2
(45) Date of Patent: Nov. 4, 2025

(54) METHOD AND APPARATUS FOR HANDLING RADIO LINK FAILURE

(71) Applicant: KONINKLIJKE PHILIPS N.V., Eindhoven (NL)

(72) Inventors: Wei Bao, Guangdong (CN); Xiaodong Yang, Guangdong (CN)

(73) Assignee: Koninklijke Philips N.V., Eindhoven (NL)

( * ) Notice: Subject to any disclaimer, the term of this patent is extended or adjusted under 35 U.S.C. 154(b) by 461 days.

(21) Appl. No.: 17/731,141

(22) Filed: Apr. 27, 2022

(65) Prior Publication Data

US 2022/0256635 A1 Aug. 11, 2022

Related U.S. Application Data

(63) Continuation of application No. PCT/CN2020/125309, filed on Oct. 30, 2020.

(30) Foreign Application Priority Data

Nov. 1, 2019 (CN) .......................... 201911061490.5

(51) Int. Cl.
*H04W 76/18* (2018.01)
*H04W 72/00* (2023.01)
*H04W 74/00* (2009.01)

(52) U.S. Cl.
CPC ........... *H04W 76/18* (2018.02); *H04W 72/00* (2013.01); *H04W 74/00* (2013.01)

(58) Field of Classification Search
None
See application file for complete search history.

(56) References Cited

U.S. PATENT DOCUMENTS

| | | | |
|---|---|---|---|
| 2014/0155114 A1 | 6/2014 | Wu | |
| 2015/0334757 A1* | 11/2015 | Seo | H04W 24/08 370/329 |
| 2016/0286374 A1* | 9/2016 | Baghel | H04W 24/10 |
| 2019/0053251 A1 | 2/2019 | Loehr et al. | |
| 2019/0110281 A1* | 4/2019 | Zhou | H04W 76/19 |
| 2019/0253949 A1* | 8/2019 | Park | H04W 36/14 |

(Continued)

FOREIGN PATENT DOCUMENTS

| | | |
|---|---|---|
| CN | 107889079 A | 4/2018 |
| EP | 2941038 A1 | 11/2015 |
| WO | 2017137231 A1 | 8/2017 |

OTHER PUBLICATIONS

First Office Action for Indian Application No. 202227030051, dated Nov. 24, 2022, 5 Pages (including English Translation).

(Continued)

*Primary Examiner* — Xavier S Wong

(57) ABSTRACT

A method and an apparatus for handling radio link failure and relates to the field of communications technologies. The method for handling radio link failure is applied to a first terminal and includes: detecting a radio link failure between the first terminal and a second terminal; and reporting an indication message of the radio link failure to a serving base station of the first terminal, where the indication message includes at least one of the following information: an identifier of radio link, an indication of radio link failure, or a cause of the radio link failure.

17 Claims, 5 Drawing Sheets

(56) References Cited

U.S. PATENT DOCUMENTS

2019/0320361 A1   10/2019  Uchiyama et al.
2020/0351968 A1*  11/2020  Yilmaz .................. H04W 76/27

OTHER PUBLICATIONS

Extended European Search Report for Application No. 20882356.7-1215, dated Dec. 5, 2022, 8 Pages.
First Office Action for Singapore Application No. 11202204379R, dated Mar. 11, 2024, 10 Pages.
International Search Report and Written Opinion for Application No. PCT/CN2020/125309, dated Jan. 29, 2021, 8 Pages.
Apple, "Discussion on SL RLM/RLF Declaration," 3GPP TSG-RAN WG2 #106, Agenda item 11.4.5, May 13-17, 2019, R2-1906773, Reno, NV, USA, 4 Pages.
Interdigital Inc., "RLM/RLF for NR V2X," 3GPP RAN WG2 #107bis, Agenda item 6.4.5, Oct. 14-18, 2019, R2-1912874 (Revision of R2-1909590), Chongqing, China, 4 Pages.
Ericsson, "Summary of Email Discussion [107# 75][NR/V2X] RLF," 3GPP TSG-RAN WG2 #107bis, Agenda item 6.4.5, Oct. 14-18, 2019, R2-1913328, Chongqing, China, 26 Pages.
Asustek, "Discussion on Sidelink RLM Indication," 3GPP TSG-RAN WG2 #107bis, Agenda item 6.4.5, Oct. 14-18, 2019, R2-1913770 (Revision of R2-1911224), Chongqing, China, 4 Pages.
LG Electronics, "Remaining Issue on PC5 RLM/RLF," 3GPP TSG-RAN WG2 #107bis, Agenda item 6.4.5, Oct. 14-18, 2019, R2-1913884, Chongqing, China, 3 Pages.
First Korean Office Action for Korean Patent Application No. 10-2022-7016742 dated Feb. 26, 2025. 15 pages.
OPPO. Left issues on PC5-S impact on AS-layer. 3GPP TSG-RAN WG2 Meeting #107bis. R2-1912074. Online. Oct. 2019. 5 pages.

* cited by examiner

METHOD AND APPARATUS FOR HANDLING RADIO LINK FAILURE

CROSS-REFERENCE TO RELATED APPLICATIONS

This application is a continuation application of International Application No. PCT/CN2020/125309 filed on Oct. 30, 2020, which claims priority to Chinese Patent Application No. 201911061490.5, filed on Nov. 1, 2019, which are incorporated herein by reference in their entireties.

TECHNICAL FIELD

This disclosure relates to the field of communications technologies, and in particular, to a method and an apparatus for handling radio link failure.

BACKGROUND

A long term evolution (LTE) system supports sidelink (referred to as secondary link, side link, or the like). As shown in FIG. 1, sidelink is used for direct data transmission between user equipments (UE) without a network device. Uplink is for uplink transmission, and downlink is for downlink transmission.

At present, there is no solution to handling a radio link failure of sidelink interface.

SUMMARY

Embodiments of this disclosure provide a method and an apparatus for handling radio link failure.

According to a first aspect, an embodiment of this disclosure provides a method for handling radio link failure, applied to a first terminal and including:
  detecting a radio link failure between the first terminal and a second terminal; and
  reporting an indication message of the radio link failure to a serving base station of the first terminal, where the indication message includes at least one of the following information:
  an identifier of radio link;
  an indication of radio link failure; or
  a cause of the radio link failure.

According to a second aspect, an embodiment of this disclosure provides a method for handling radio link failure, applied to a first base station and including:
  receiving an indication message of a radio link failure reported by a first terminal, where the indication message includes at least one of the following information: an identifier of radio link, an indication of radio link failure, or a cause of the radio link failure; and
  releasing a resource corresponding to the radio link.

According to a third aspect, an embodiment of this disclosure further provides an apparatus for handling radio link failure, applied to a first terminal and including:
  a detection module, configured to detect a radio link failure between the first terminal and a second terminal; and
  a reporting module, configured to report an indication message of the radio link failure to a serving base station of the first terminal, where the indication message includes at least one of the following information:
  an identifier of radio link;
  an indication of radio link failure; or
  a cause of the radio link failure.

According to a fourth aspect, an embodiment of this disclosure provides an apparatus for handling radio link failure, applied to a first base station and including:
  a receiving module, configured to receive an indication message of a radio link failure reported by a first terminal, where the indication message includes at least one of the following information: an identifier of radio link, an indication of radio link failure, or a cause of the radio link failure; and
  a releasing module, configured to release a resource corresponding to the radio link.

According to a fifth aspect, an embodiment of this disclosure further provides a communications device, where the communications device includes a processor, a memory, and a computer program stored in the memory and running on the processor, and when the processor executes the computer program, the steps of the foregoing method for handling radio link failure are implemented.

According to a sixth aspect, an embodiment of this disclosure further provides a non-transitory computer-readable storage medium, where the non-transitory computer-readable storage medium stores a computer program, and when the computer program is executed by a processor, the steps of the foregoing method for handling radio link failure are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

DETAILED DESCRIPTION

Figure 1:
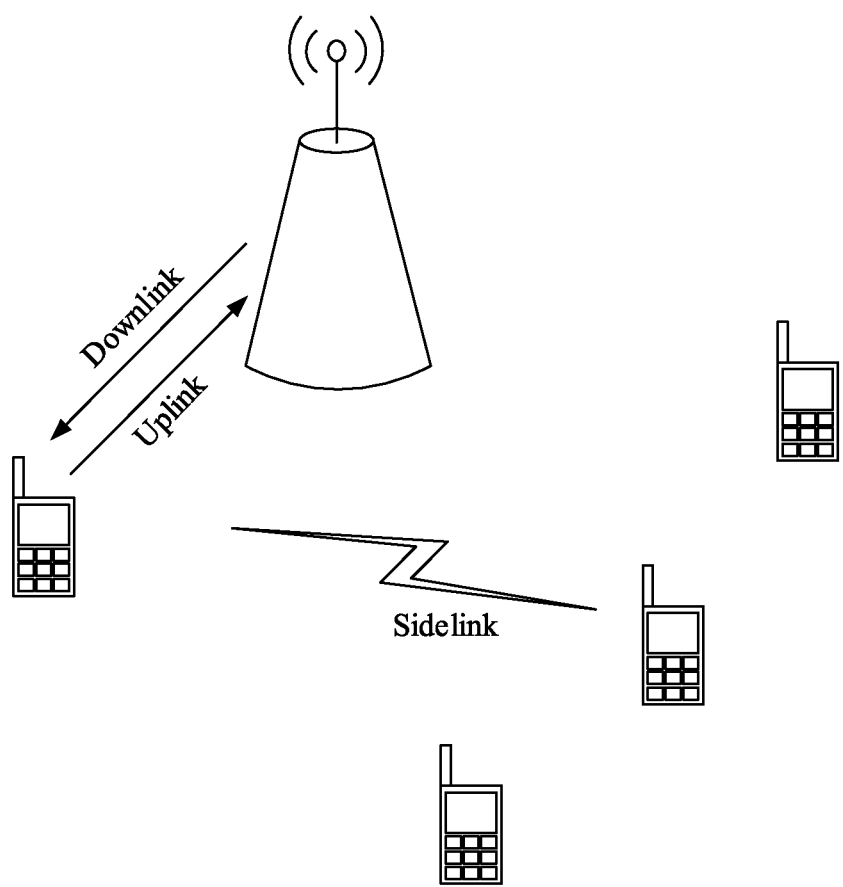
FIG. 1 is a schematic diagram of a sidelink in an LTE system.

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. "And/or" in the specification and claims represents at least one of connected objects.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system may implement radio technologies such as CDMA2000 and universal terrestrial radio access (UTRA). UTRA includes wideband CDMA (Wideband Code Division Multiple Access, WCDMA) and other CDMA variants. The TDMA system can implement radio technologies such as global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are part of the universal mobile telecommunications system (UMTS). LTE and more advanced LTEs (such as LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. The functions and arrangements of the elements under discussion may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

A long term evolution (LTE) system supports sidelink (or referred to as secondary link, side link, or the like). As shown in FIG. 1, sidelink is used for direct data transmission between user equipments (UE) without through a network device. Uplink is for uplink transmission, and downlink is for downlink transmission.

LTE sidelink is designed to be applicable to specific public safety affairs (for example, emergency communication on a fire site or a disaster site such as an earthquake), vehicle to everything (V2X) communication, or the like. The vehicle to everything communication includes various services, for example, basic security communication, advanced (autonomous) driving, platooning, and sensor extension. LTE sidelink supports only broadcast communication, and therefore is mainly used for basic security communication. Other advanced V2X services with strict quality of service (QoS) requirements in terms of delay and reliability are supported by new radio (NR) sidelink.

The 5G NR system may be used in operating bands above 6 GHz that are not supported by LTE, and supports a larger operating bandwidth. However, the existing NR system only supports an interface between a base station and a terminal, and does not support a sidelink interface for direct communication between terminals.

The sidelink interface may also be called PC5 interface. Currently, sidelink transmission mainly includes: broadcast, groupcast, and unicast. Unicast, as its name implies, is a one-to-one (one to one) transmission. Groupcast is a one-to-many (one to many) transmission. Broadcast is also a one-to-many transmission, but for broadcast, there is no concept that UEs belong to a same group. At present, a physical layer hybrid automatic repeat request (HARD) feedback mechanism is supported in groupcast and unicast communication.

Resource allocation modes of sidelink UE are divided into two categories:

(1) base station scheduling mode (Mode 1): BS schedules SL resource(s) to be used by UE for SL transmission(s), meaning that a base station controls and allocates a resource to each UE; and (2) UE autonomous mode (Mode 2): UE determines, i.e. BS does not schedule, SL transmission resource(s) within SL resources configured by BS/network or pre-configured SL resources, meaning that each UE selects a resource autonomously.

In Uu interface, radio link failure (RLF) may be triggered due to the following causes: a physical layer reports that a link is poor and is unable to be recovered within a specified period of time; media access control (MAC) indicates a random access problem; and a maximum number of radio link control (RLC) acknowledgment mode (AM) retransmissions has been reached.

However, the method for handling radio link failure of the Uu interface is not applicable to the sidelink interface, and there is no further solution to handling the a radio link failure of the sidelink interface.

The embodiments of this disclosure provide a method and an apparatus for handling radio link failure, so as to release and reclaim resources for a failed radio link in a timely manner.

Figure 2:
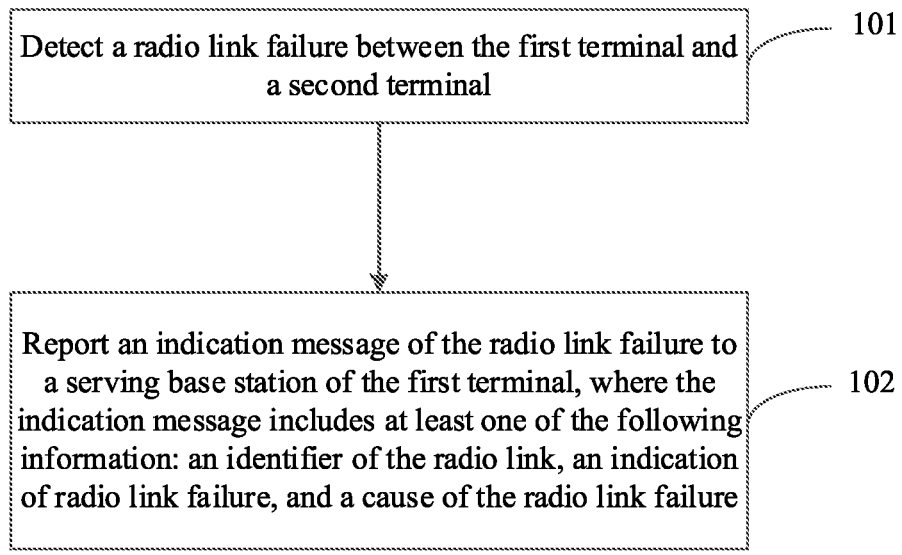
FIG. 2 is a schematic flowchart of a method for handling radio link failure applied to a first terminal according to an embodiment of this disclosure.

An embodiment of this disclosure provides a method for handling radio link failure applied to a first terminal and, as shown in FIG. 2, including the following steps.

Step 101: Detect a radio link failure between the first terminal and a second terminal.

Step 102: Report an indication message of the radio link failure to a serving base station of the first terminal, where the indication message includes at least one of the following information:

an identifier of radio link;

an indication of radio link failure; or a cause of the radio link failure.

In this embodiment, after detecting the radio link failure between the first terminal and the second terminal, the first terminal reports the indication message of the radio link failure to a first serving base station of the first terminal. In this way, the first serving base station of the first terminal learns the radio link failure in a timely manner and performs handling, so that the resource for the failed radio link can be released and reclaimed in a timely manner, thereby avoiding waste of resources, better controlling radio link data transmission, and providing better user experience.

Specifically, the radio link may be a PC5 link. Certainly, the radio link is not limited to a PC5 link, and may also be other types of radio links.

Optionally, before the detecting a radio link failure between the first terminal and a second terminal, the method further includes any one of the following:

receiving a first notification message of the second terminal, where the first notification message includes information of a serving base station of the second terminal; or sending a second notification message to the second terminal, where the second notification message includes information of the serving base station of the first terminal.

In this way, the first terminal and the second terminal can exchange the information of their respective serving base stations before the radio link fails, so that the first terminal and the second terminal can learn the information of the serving base station of the peer terminal.

In addition, after the first terminal changes its serving base station, the first terminal also needs to send a third notification message to the second terminal, where the third notification message includes information of the serving base station of the first terminal, so that the second terminal learns the latest serving base station of the first terminal in a timely manner.

The first notification message is not limited to the information of the serving base station of the second terminal, and may also include an identity of the second terminal and/or information of the radio link. The second notification message is not limited to the information of the serving base station of the first terminal, and may also include an identity of the first terminal and/or the information of the radio link.

Optionally, the information of the serving base station of the first terminal includes at least one of the following:

a cell identifier of a primary cell of the first terminal;

a base station identifier of the primary cell of the first terminal;

a cell identifier of a cell on which the first terminal camps; or a base station identifier of the cell on which the first terminal camps; and the information of the serving base station of the second terminal includes at least one of the following:

a cell identifier of a primary cell of the second terminal; or a cell identifier of a cell on which the second terminal camps.

The cell identifier has 28 bits, the base station identifier has 20 bits, and the base station identifier is the first 20 bits of the cell identifier. Certainly, the cell identifier is not limited to 28 bits, the base station identifier is not limited to 20 bits, and other number of bits may be used. Typically, after the serving base station of a terminal is found, the terminal can be found based on a UE identifier. After the terminal is found, it is also necessary to determine, based on the information of the radio link, which radio link of the UE encounters a problem.

Optionally, after the detecting a radio link failure between the first terminal and a second terminal, the method further includes:

reporting information of the second terminal to the serving base station of the first terminal, where the information of the second terminal includes at least one of the following:

an identity of the second terminal and information of the serving base station of the second terminal; or information of the radio link.

The serving base station of the first terminal may know the information of the radio link, or may not obtain accurate information of the radio link. In this case, the first terminal needs to report the information of the radio link.

The information of the second terminal includes first information about whether the second terminal is a transmit end; or the information of the second terminal is reported by the first terminal to the serving base station of the first terminal in a case that the second terminal is a transmit end.

Figure 3:
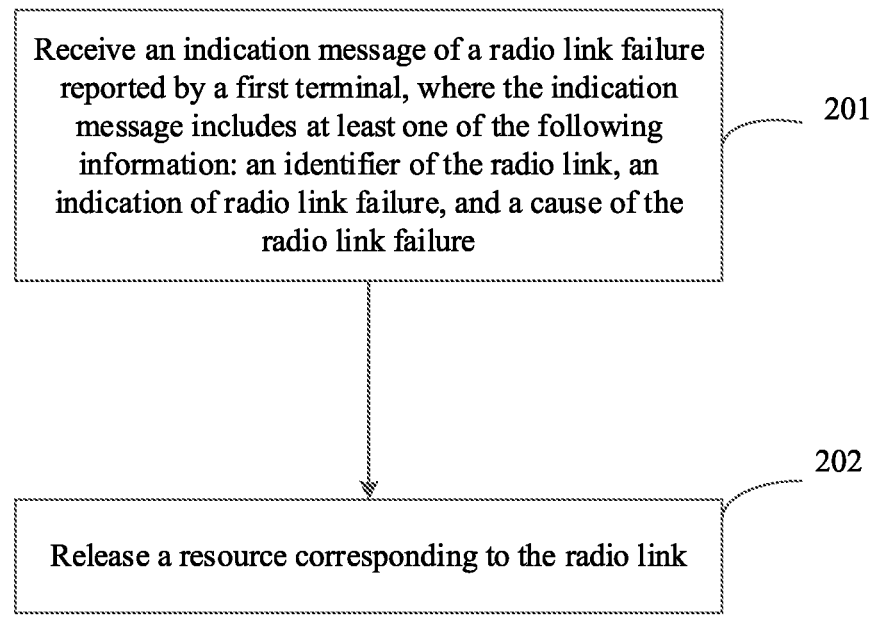
FIG. 3 is a schematic flowchart of a method for handling radio link failure applied to a first base station according to an embodiment of this disclosure.

An embodiment of this disclosure further provides a method for handling radio link failure, applied to a first base station and, as shown in FIG. 3, including:

Step 201: Receive an indication message of a radio link failure reported by a first terminal, where the indication message includes at least one of the following information: an identifier of radio link, an indication of radio link failure, or a cause of the radio link failure.

Step 202: Release a resource corresponding to the radio link.

In this embodiment, after detecting the radio link failure between the first terminal and a second terminal, the first terminal reports the indication message of the radio link failure to a first serving base station of the first terminal. In this way, the first serving base station of the first terminal learns the radio link failure in a timely manner and performs handling, so that the resource for the failed radio link can be released and reclaimed in a timely manner, thereby avoiding waste of resources, better controlling radio link data transmission, and providing better user experience.

One or more radio links may be present between the first terminal and the second terminal. The first terminal may report an indication message of failure of one or more of the radio links to the second terminal.

Optionally, the resource corresponding to the radio link includes at least one of the following:

a sidelink resource pool;

a periodically configured sidelink resource; or a Uu interface resource used for assisting a sidelink.

Optionally, the method further includes:

receiving information of a second terminal reported by the first terminal, where the radio link is a radio link between the first terminal and the second terminal, and the information of the second terminal includes at least one of the following:

an identity of the second terminal and information of a serving base station of the second terminal; or information of the radio link.

Optionally, after the receiving an indication message of a radio link failure reported by a first terminal, the method further includes:

sending a first indication message to a second base station to indicate radio link failure between the second terminal and the first terminal, where the first indication message is used for the second base station to release the resource corresponding to the radio link, and the second base station is a serving base station of the second terminal, so that the second base station can reclaim and release the resource of the radio link.

Specifically, the sending a first indication message to a second base station includes:

sending the first indication message to the second base station through an Xn and/or X2 interface.

Optionally, the first indication message includes at least one of the following:
an indication of sidelink radio link failure;
the information of the second terminal;
an identifier of radio link; or
a destination identifier of radio link.

Optionally, the information of the second terminal includes first information about whether the second terminal is a transmit end; or
the information of the second terminal is reported by the first terminal in a case that the second terminal is a transmit end.

The method for handling radio link failure of this disclosure is further described below with reference to the accompanying drawings and specific embodiments.

Embodiment 1

In this embodiment, after a radio link failure, a terminal reports a radio link failure message to a base station.

In a Uu interface, radio link failure may be triggered by at least one of the following causes:
that a physical layer continuously reports that a link is poor and unable to be recovered within a specified period of time;
that MAC indicates a random access problem; or
that a maximum number of RLC AM retransmissions has been reached.

For sidelink unicast UEs, because a one-to-one link is established between UE1 (that is, a first terminal) and UE2 (that is, a second terminal), it is also necessary to check quality of the link. When the link does not meet operating conditions, it is considered that radio link failure has occurred. Currently, a sidelink interface does not support a random access procedure at a MAC layer. Therefore, radio link failure cannot be triggered based on the random access problem indicated by the MAC. However, in a case that the sidelink unicast is configured with AM mode, if the maximum number of retransmissions has been reached, the RLC protocol is no longer functional, and RLF also needs to be triggered.

Therefore, the following two mechanisms for triggering RLF in the sidelink may be used:
One mechanism is that the physical layer continuously reports that a link is poor and unable to be recovered within a specified period of time. The other mechanism is that a maximum number of retransmissions has been reached in RLC AM. The first trigger manner is typically triggered by a receive end. Because there is no periodic or continuous transmission of reference signals on the sidelink interface, quality measurement of the physical layer is based on the reference signal transmitted with the data, and only the recipient of the data can perform link quality measurement. In the case of unidirectional service transmission, only the UE at one end may perform measurement. In the case of bidirectional service transmission, the UEs at both ends may perform measurement. The second trigger manner is an action of the transmit end, and can only be triggered by the transmit end. In a case that services are sent at both ends, both ends can trigger the RLF as a transmit end.

After the RLF is triggered, it indicates that the sidelink link cannot be used any longer, then the UE detecting the RLF can report such condition to the base station, where the reported information may include at least one of the following:
an identifier of radio link, such as a V2X link ID or a destination ID;
an RLF indication, used to indicate that it is an RLF report, which may be indicated by a signaling name or an explicit field in general signaling; or
a cause of the radio link failure, for example, triggered by a physical layer or RLC.

After receiving the RLF report, the base station releases the resource corresponding to the radio link, such as a dedicated sidelink pool resource, a periodically configured sidelink resource, or a Uu interface resource for assisting the sidelink.

Embodiment 2

In this embodiment, UEs at both ends of a radio link exchange respective information.

During the active period of a sidelink, UEs at both ends of sidelink unicast may exchange information of serving base stations of the UEs, and may also exchange identity information of the UEs and/or information of the radio link.

In a specific embodiment, when a sidelink is being established or configured, the UEs exchange information of their own serving base stations with each other, or may also exchange the identity information of the UEs, and/or the information of the radio link The information of the serving base station may be a cell identifier cell ID of a Pcell (primary cell) for UE in a connected state, or may be a cell identifier of a camping cell for UE in an idle/inactive state. The identity information of the UE and the information of the radio link may be a V2X link ID, a destination L2 ID, a cell-radio network temporary identifier (CRNTI) of UE in a connected state, an Inactive Resume ID, and the like, as long as another base station can find the peer-end UE on the link corresponding to the UE.

The information exchange may be performed in combination with or in parallel with capability reporting or link configuration.

In the process of sidelink unicast communication, because the UE is in a mobile state, the serving base station of the UE is changing. For example, when handover and cell reselection occur, the UE needs to update information of its serving base station for the peer-end UE, that is, when its serving base station changes, the UE is triggered to report the change of its serving base station to the peer-end UE by using PC5 radio resource control (RRC) signaling that carries information of the latest serving base station of the UE, and optionally, may also carry identity information of the UE and/or information of the radio link to identify the UE. To obtain information of the latest serving base station of the peer-end UE, for sidelink RRC signaling, it is necessary to exchange information when the sidelink link is initially established, and exchange updated information in real time when the information changes. Because once RLF occurs, the sidelink link will fail, and the exchange of information will not succeed.

After the UE at each end of the sidelink obtains information of the serving base station of the peer-end UE or updated information of the serving base station of the peer-end UE through RRC signaling exchange, the UE reports the information to its serving base station to store the information as context information of the UE. Alternatively, when the UE at each end of the sidelink obtains latest information of the serving base station, identity information of the UE, and/or information of the radio link of the peer-end UE through RRC signaling exchange, the information is first stored in the UE, and when reporting is needed, for example, when RLF is triggered, the information is reported to the serving base station with the RLF, so that the serving base station releases a resource of the peer-end UE. This eliminates the Uu interface reporting and updating procedures, and the information only needs to be reported together with the RLF.

Embodiment 3

In this embodiment, the first base station notifies the second base station of radio link failure.

Data volumes of UEs at two ends of the sidelink unicast may be unequal. The UE having a larger amount of data will have more measurement opportunities, and the UE having a smaller amount of data will have fewer measurement opportunities. Therefore, when RLF occurs, it is very likely that only the UE at one end has detected the RLF, while the UE at the other end has not detected the RLF yet. In this case, the UE that has detected the RLF can notify the other UE to release resources, which can improve the utilization of the resources.

Figure 4:
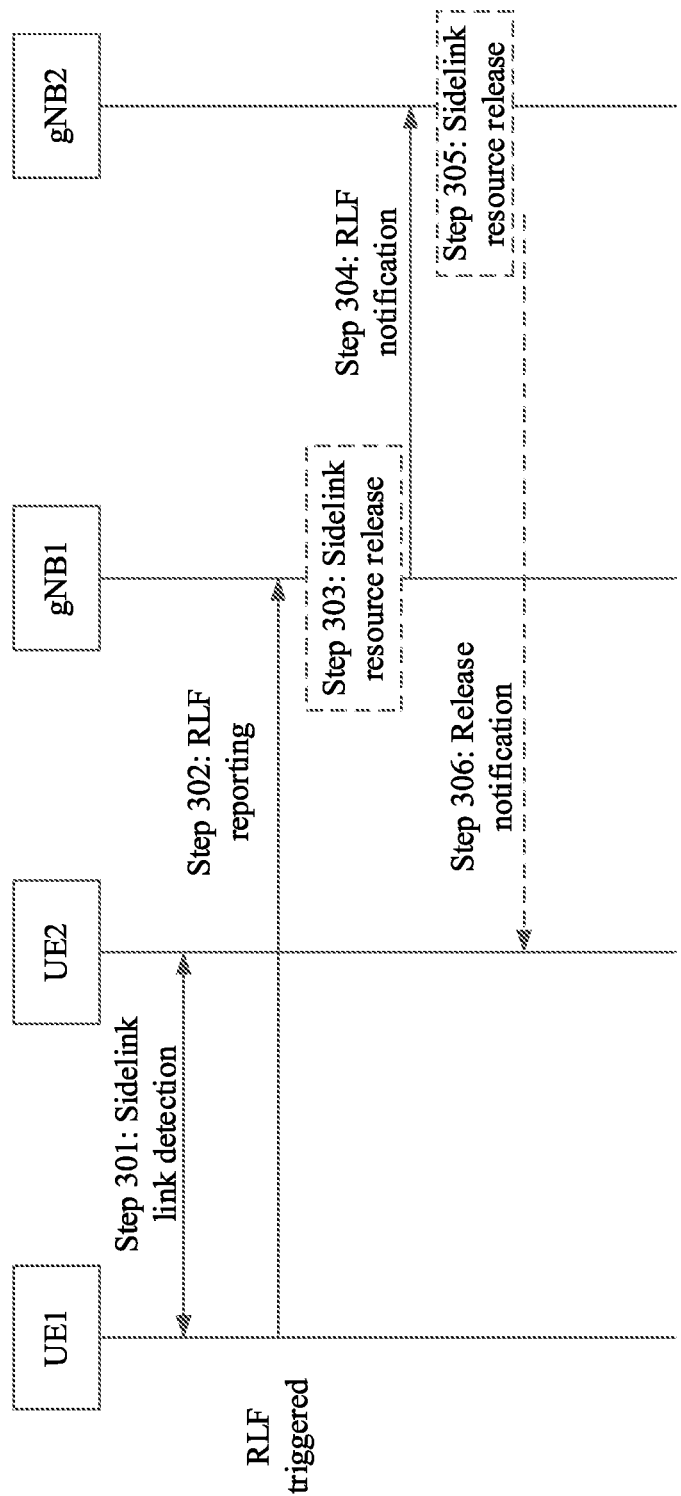
FIG. 4 is a schematic flowchart of a method for handling radio link failure according to a specific embodiment of this disclosure.

Specifically, as shown in FIG. 4, the following steps are included.

Step 301: UE1 (that is, the first UE) performs sidelink link detection.

Step 302: When RLF is detected, UE1 reports the RLF to its serving base station gNB1 (that is, the first base station).

Step 303: gNB1 releases a sidelink resource.

Step 304: gNB1 notifies gNB2 (that is, the second base station) of the RLF.

Because identity information of the serving base station gNB2 of peer-end UE2 and/or information of radio link is stored in the serving base station gNB1, the serving base station gNB1 can send sidelink RLF indication information to gNB2 through an Xn/X2 interface. The indication information needs to carry a sidelink RLF indication, a UE2 indication, a link ID or destination ID indication of the sidelink link, or the like, so that gNB2 can find the corresponding UE2 and/or the information of the radio link and perform release processing correctly.

Step 305: gNB2 releases a sidelink resource.

After receiving the sidelink RLF information from gNB1, the base station gNB2 finds the corresponding UE2 and/or the radio link based on the carried information, and releases a sidelink link resource for the radio link with the radio link failure.

Step 306: gNB2 sends a release notification to UE2 (that is, the second terminal).

The base station gNB2 may also release UE2, indicating that RLF has occurred, and the sidelink communication may end.

In a specific embodiment, in a case that UE1 as a sidelink receive end determines that a condition for triggering RLF is met by measuring a reference signal in the received data, UE1 reports the RLF to its serving base station gNB1. Because there may be a plurality of links between UE1 and UE2, it is necessary to indicate which sidelink link fails, and also indicate information of the peer-end UE, including information of the serving base station gNB2 and identity information of UE2, radio link information, and the like. When receiving the report of the RLF, gNB1 may release a resource of the sidelink at its end, and send an Xn and/or X2 message to the serving base station gNB2 of the peer-end UE2, notifying gNB2 of the RLF of the sidelink. After receiving the message, gNB2 may release a corresponding resource based on the information of UE2 and information of the radio link that are carried in the message, and send a sidelink link release message to UE2 through the Uu interface to end the sidelink communication and reclaim the resource. In a case that two UEs belong to the same base station, a link and resource of the peer-end UE can be directly released without interface signaling exchange.

Further, in a case that the UE reports RLF to its serving base station, the UE can also report some additional information, for example, whether the peer-end UE is a transmit end. This is because only a transmit-end UE needs to release a resource. If the peer-end UE is not a transmit-end UE, it is not necessary to notify, through an Xn and/or X2 message, the peer-end UE to release the radio link. Alternatively, only when the peer-end UE is a transmit end and it is necessary to notify the peer-end UE to release the resource, the UE reports information of the serving base station of the peer-end UE, to implicitly indicate whether it is necessary to notify, through an Xn and/or X2 message, the peer-end UE to release the radio link.

Figure 5:
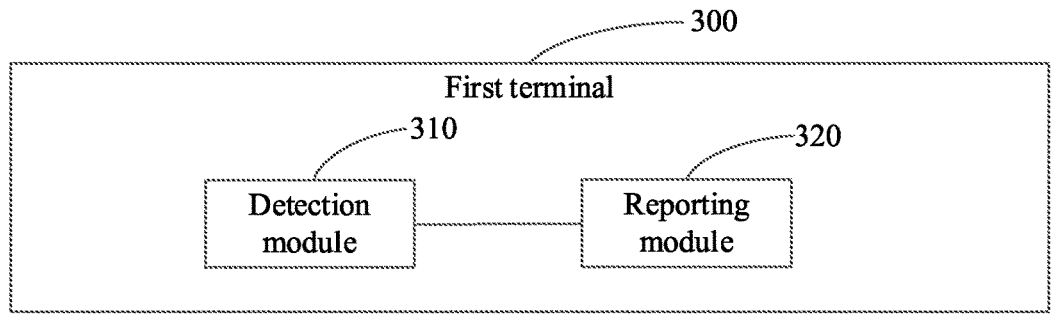
FIG. 5 is a schematic modular structural diagram of a first terminal according to an embodiment of this disclosure.

An embodiment of this disclosure further provides an apparatus for handling radio link failure, applied to a first terminal. As shown in FIG. 5, the first terminal 300 includes:

a detection module 310, configured to detect a radio link failure between the first terminal and a second terminal; and a reporting module 320, configured to report an indication message of the radio link failure to a serving base station of the first terminal, where the indication message includes at least one of the following information:

an identifier of radio link;

an indication of radio link failure; or a cause of the radio link failure.

In this embodiment, after detecting the radio link failure between the first terminal and the second terminal, the first terminal reports the indication message of the radio link failure to a first serving base station of the first terminal. In this way, the first serving base station of the first terminal learns the radio link failure in a timely manner and performs handling, so that the resource for the failed radio link can be released and reclaimed in a timely manner, thereby avoiding waste of resources, better controlling radio link data transmission, and providing better user experience.

Specifically, the radio link may be a PC5 link. Certainly, the radio link is not limited to a PC5 link, and may also be other types of radio links.

Optionally, the apparatus further includes:

a transceiver module, configured to, before the radio link failure between the first terminal and the second terminal is detected, receive a first notification message of the second terminal, where the first notification message includes information of a serving base station of the second terminal; and/or send a second notification message to the second terminal, where the second notification message includes information of the serving base station of the first terminal.

In this way, the first terminal and the second terminal can exchange the information of their respective serving base stations before the radio link fails, so that the first terminal and the second terminal can learn the information of the serving base station of the peer terminal.

In addition, after the first terminal changes its serving base station, the first terminal also needs to send a third notification message to the second terminal, where the third notification message includes information of the serving base station of the first terminal, so that the second terminal learns the latest serving base station of the first terminal in a timely manner.

The first notification message is not limited to the information of the serving base station of the second terminal, and may also include an identity of the second terminal and/or information of the radio link. The second notification message is not limited to the information of the serving base station of the first terminal, and may also include an identity of the first terminal and/or the information of the radio link.

Optionally, the information of the serving base station of the first terminal includes at least one of the following:
a cell identifier of a primary cell of the first terminal;
a base station identifier of the primary cell of the first terminal;
a cell identifier of a cell on which the first terminal camps; or
a base station identifier of the cell on which the first terminal camps; and
the information of the serving base station of the second terminal includes at least one of the following:
a cell identifier of a primary cell of the second terminal; or
a cell identifier of a cell on which the second terminal camps.

The cell identifier has 28 bits, the base station identifier has 20 bits, and the base station identifier is the first 20 bits of the cell identifier. Certainly, the cell identifier is not limited to 28 bits, the base station identifier is not limited to 20 bits, and other number of bits may be used. Typically, after the serving base station of a terminal is found, the terminal can be found based on a UE identifier. After the terminal is found, it is also necessary to determine, based on the information of the radio link, which radio link of the UE encounters a problem.

Optionally, after the radio link failure between the first terminal and the second terminal is detected, the transceiver module is further configured to report information of the second terminal to the serving base station of the first terminal, where the information of the second terminal includes at least one of the following:
an identity of the second terminal and information of the serving base station of the second terminal; or
information of the radio link.

The serving base station of the first terminal may know the information of the radio link, or may not obtain accurate information of the radio link. In this case, the first terminal needs to report the information of the radio link.

The information of the second terminal includes first information about whether the second terminal is a transmit end; or
the information of the second terminal is reported by the first terminal to the serving base station of the first terminal in a case that the second terminal is a transmit end.

Figure 7:
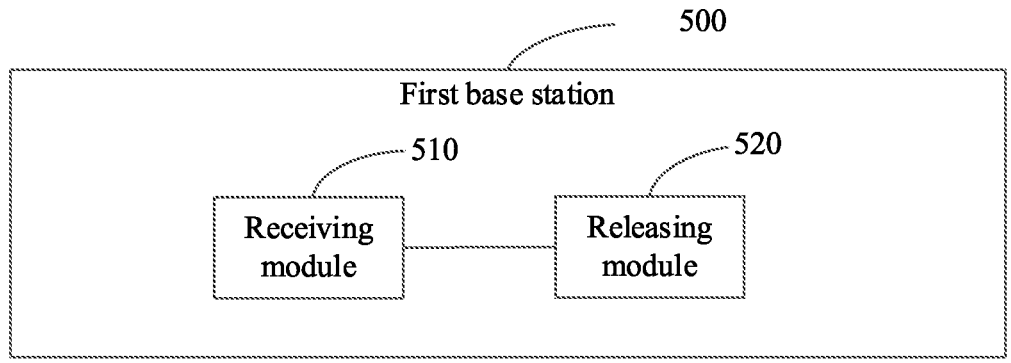
FIG. 7 is a schematic modular structural diagram of a first base station according to an embodiment of this disclosure.

An embodiment of this disclosure further provides an apparatus for handling radio link failure, applied to a first base station. As shown in FIG. 7, the first base station 500 includes:
a receiving module 510, configured to receive an indication message of a radio link failure reported by a first terminal, where the indication message includes at least one of the following information: an identifier of radio link, an indication of radio link failure, or a cause of the radio link failure; and
a releasing module 520, configured to release a resource corresponding to the radio link.

In this embodiment, after detecting the radio link failure between the first terminal and a second terminal, the first terminal reports the indication message of the radio link failure to a first serving base station of the first terminal. In this way, the first serving base station of the first terminal learns the radio link failure in a timely manner and performs handling, so that the resource for the failed radio link can be released and reclaimed in a timely manner, thereby avoiding waste of resources, better controlling radio link data transmission, and providing better user experience.

One or more radio links may be present between the first terminal and the second terminal.

Optionally, the resource corresponding to the radio link includes at least one of the following:
a sidelink resource pool;
a periodically configured sidelink resource; or
a Uu interface resource used for assisting a sidelink.

Optionally, the receiving module is further configured to receive information of a second terminal reported by the first terminal, where the radio link is a radio link between the first terminal and the second terminal, and the information of the second terminal includes at least one of the following:
an identity of the second terminal and information of a serving base station of the second terminal; or
information of the radio link.

Optionally, the apparatus further includes:
a sending module, configured to, after the indication message of the radio link failure reported by the first terminal is received, send a first indication message to a second base station to indicate the radio link failure between the second terminal and the first terminal, where the first indication message is used for the second base station to release a resource corresponding to the radio link, and the second base station is the serving base station of the second terminal.

Specifically, the sending module is configured to send the first indication message to the second base station through an Xn and/or X2 interface.

Optionally, the first indication message includes at least one of the following:
an indication of sidelink radio link failure;
the information of the second terminal;
an identifier of radio link; or
a destination identifier of radio link Optionally, the information of the second terminal includes first information about whether the second terminal is a transmit end; or
the information of the second terminal is reported by the first terminal in a case that the second terminal is a transmit end.

An embodiment of this disclosure further provides a communications device, where the communications device includes a processor, a memory, and a computer program stored in the memory and running on the processor; and when the processor executes the computer program, the steps of the method for handling radio link failure are implemented.

The communications device may be a terminal or a base station.

Figure 6:
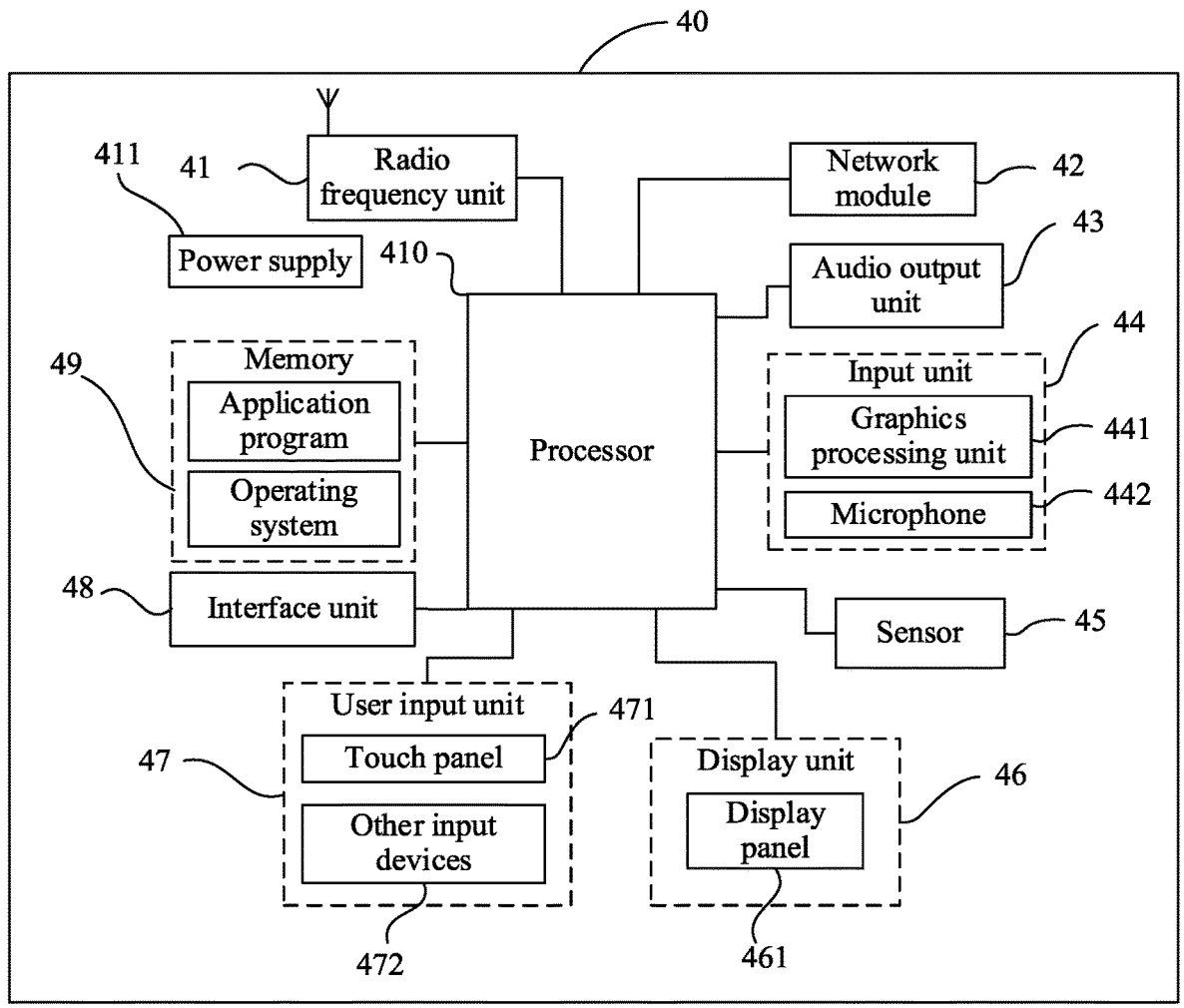
FIG. 6 is a schematic diagram of composition of a first terminal according to an embodiment of this disclosure.

To better achieve the foregoing objective, further, FIG. 6 is a schematic diagram of a hardware structure of a terminal for implementing each embodiment of this disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 6 does not constitute any limitation on the terminal. The terminal may include more or fewer components than those shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, and the like.

The processor 410 is configured to detect a radio link failure between the terminal and the second terminal and report an indication message of the radio link failure to a serving base station of the terminal, where the indication message includes at least one of the following information:

an identifier of radio link;

an indication of radio link failure; or a cause of the radio link failure.

It should be understood that, in this embodiment of this disclosure, the radio frequency unit 41 may be configured to transmit or receive a signal in an information transmitting/receiving or call process. Specifically, the radio frequency unit 41 receives downlink data from a base station, transmits the downlink data to the processor 410 for processing, and transmits uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may further communicate with a network and other devices via a wireless communications system.

The terminal provides a user with wireless broadband Internet access by using the network module 42, for example, helping the user to transmit and receive e-mails, browse web pages, and access streaming media.

The audio output unit 43 may convert audio data received by the radio frequency unit 41 or the network module 42 or stored in the memory 49 into an audio signal and output the audio signal as a sound. In addition, the audio output unit 43 may further provide audio output (for example, a call signal received tone or a message received tone) that is related to a specific function performed by the terminal 40. The audio output unit 43 includes a speaker, a buzzer, a receiver, and the like.

The input unit 44 is configured to receive an audio signal or a video signal. The input unit 44 may include a graphics processing unit (GPU) 441 and a microphone 442. The graphics processing unit 441 processes image data of a static picture or a video obtained by an image capture apparatus (for example, a camera) in an image capture mode or a video capture mode. A processed image frame may be displayed on the display unit 46. The image frame processed by the graphics processing unit 441 may be stored in the memory 49 (or another storage medium) or transmitted by using the radio frequency unit 41 or the network module 42. The microphone 442 is capable of receiving sounds and processing such sounds into audio data. The processed audio data can be converted into a format output that can be transmitted to a mobile communication base station through the radio frequency unit 41 in a telephone call mode.

The terminal 40 further includes at least one sensor 45, for example, an optical sensor, a motion sensor, and other sensors. Specifically, the optical sensor includes an ambient light sensor and a proximity sensor. The ambient light sensor may adjust brightness of a display panel 461 based on intensity of ambient light. When the terminal 40 moves near an ear, the proximity sensor may disable the display panel 461 and/or backlight. As a motion sensor, an accelerometer sensor may detect magnitudes of accelerations in various directions (typically three axes), and in a stationary state, may detect the magnitude and direction of gravity, and may be applied to terminal posture recognition (for example, switching between a landscape orientation and a portrait orientation, related gaming, and magnetometer posture calibration), vibration recognition related functions (for example, pedometer and tapping), and the like. The sensor 45 may further include a fingerprint sensor, a pressure sensor, an iris sensor, a molecular sensor, a gyroscope, a barometer, a hygrometer, a thermometer, an infrared sensor, and the like. Details are not described herein.

The display unit 46 is configured to display information input by the user or information provided to the user. The display unit 46 may include the display panel 461. The display panel 461 may be configured in a form of a liquid crystal display (LCD), an organic light-emitting diode (OLED), or the like.

The user input unit 47 may be configured to receive input digit or character information, and generate key signal input that is related to user setting and function control of the terminal. Specifically, the user input unit 47 includes a touch panel 471 and other input devices 472. The touch panel 471, also referred to as a touchscreen, may capture a touch operation performed by a user on or near the touch panel (for example, an operation performed by the user on the touch panel 471 or near the touch panel 471 by using a finger or any appropriate object or accessory such as a stylus). The touch panel 471 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 410, and receives and executes a command sent by the processor 410. In addition, the touch panel 471 may be implemented in a plurality of forms, for example, as a resistive, capacitive, infrared, or surface acoustic wave touch panel. In addition to the touch panel 471, the user input unit 47 may further include other input devices 472. Specifically, the other input devices 472 may include but are not limited to a physical keyboard, a function key (such as a volume control key or an on/off key), a trackball, a mouse, and a joystick. Details are not described herein.

Further, the touch panel 471 may cover the display panel 461. After detecting a touch operation on or near the touch panel 471, the touch panel 471 transmits the touch operation to the processor 410 to determine a type of a touch event. Then the processor 410 provides a corresponding visual output on the display panel 461 based on the type of the touch event.

Although the touch panel 471 and the display panel 461 are used as two separate components to implement input and output functions of the terminal in FIG. 6, the touch panel 471 and the display panel 461 may be integrated to implement the input and output functions of the terminal in some embodiments. This is not specifically limited herein.

The interface unit 48 is an interface between an external apparatus and the terminal 40. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 48 may be configured to receive an input (for example, data information or power) from the external apparatus and transmit the received input to one or more elements within the terminal 40, or may be configured to transmit data between the terminal 40 and the external apparatus.

The memory 49 may be configured to store software programs and various data. The memory 49 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 49 may include a high-speed random access memory, and may further include a non-volatile memory such as a disk storage device, a flash memory device, or another volatile solid-state storage device.

The processor 410 is a control center of the terminal, and is connected to all components of the terminal by using various interfaces and lines. By running or executing software programs and/or modules that are stored in the memory 49 and calling data stored in the memory 49, the processor 410 executes various functions of the terminal and processes data, so as to perform overall monitoring on the terminal. The processor 410 may include one or more processing units. Optionally, the processor 410 may integrate an application processor and a modem processor. The application processor mainly processes the operating system, a user interface, an application program, and the like. The modem processor mainly processes wireless communication. It can be understood that the modem processor may alternatively be not integrated in the processor 410.

The terminal 40 may further include a power supply 411 (for example, a battery) that supplies power to the components. Optionally, the power supply 411 may be logically connected to the processor 410 by using a power management system, so as to implement functions such as charging management, discharging management, and power consumption management by using the power management system.

In addition, the terminal 40 includes some functional modules that are not shown. Details are not described herein.

Optionally, an embodiment of this disclosure further provides a terminal, including: a processor 410, a memory 49, and a computer program that is stored in the memory 49 and is capable of running on the processor 410. When the computer program is executed by the processor 410, the processes of the foregoing embodiments of the method for handling radio link failure are implemented, with the same technical effects achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, a remote terminal, an access terminal, a user terminal, a user agent, or a user device (User Device or User Equipment). This is not limited herein.

An embodiment of this disclosure further provides a non-transitory computer-readable storage medium, where a computer program is stored in the non-transitory computer-readable storage medium. When the computer program is executed by a processor, the processes of the foregoing embodiments of the method for handling radio link failure on the terminal side can be implemented, with the same technical effects achieved. To avoid repetition, details are not described herein again. For example, the non-transitory computer-readable storage medium is a read-only memory (ROM), a random access memory (RAM), a magnetic disk, or an optical disk.

Figure 8:
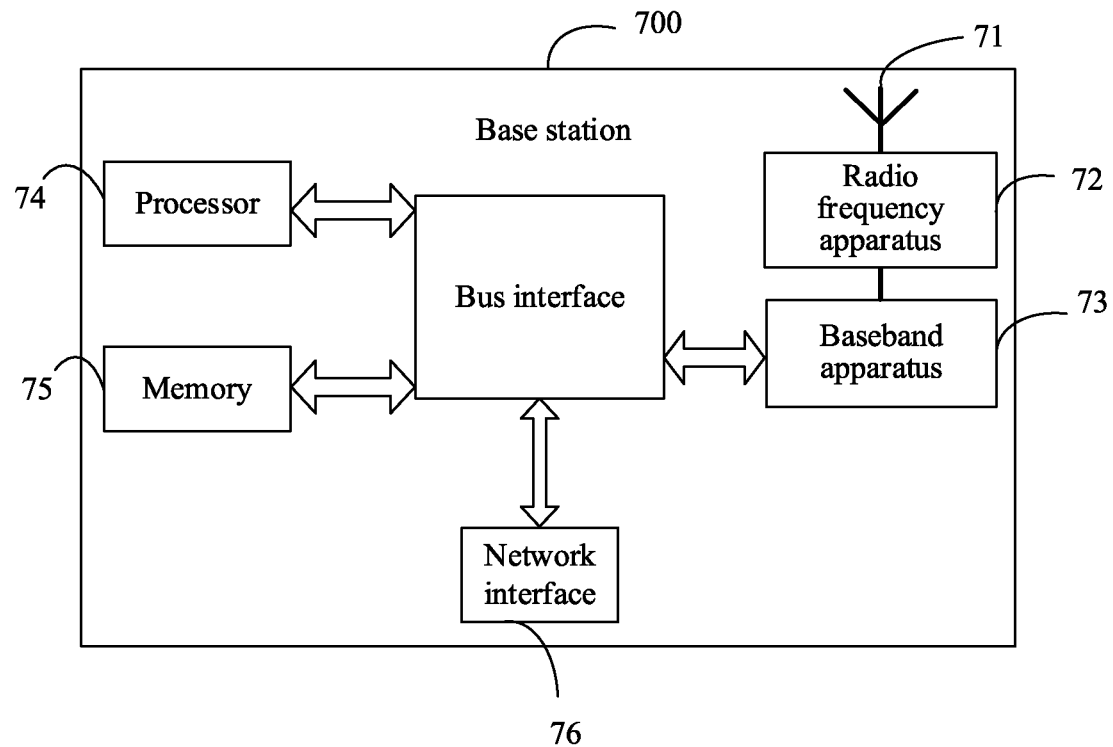
FIG. 8 is a schematic diagram of composition of a first base station according to an embodiment of this disclosure.

Specifically, an embodiment of this disclosure further provides a base station. As shown in FIG. 8, the base station 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and transmits the received information to the baseband apparatus 73 for processing. In a downlink direction, the baseband apparatus 73 processes to-be-transmitted information, and transmits the information to the radio frequency apparatus 72. The radio frequency apparatus 72 processes the received information and then transmits the information by using the antenna 71.

The foregoing apparatus for handling radio link failure may be located in the baseband apparatus 73. The method performed by the base station in the foregoing embodiment may be implemented by the baseband apparatus 73, and the baseband apparatus 73 includes a processor 74 and a memory 75.

The baseband apparatus 73 may include, for example, at least one baseband processing unit, where a plurality of chips are disposed on the baseband processing unit. As shown in FIG. 8, one of the chips is, for example, the processor 74, and connected to the memory 75, to invoke the program in the memory 75 to perform the operations of the base station shown in the foregoing method embodiment.

The baseband apparatus 73 may further include a network interface 76, configured to exchange information with the radio frequency apparatus 72, where the interface is, for example, a common public radio interface (CPRI).

The processor herein may be one processor, or may be a collective term for a plurality of processing components. For example, the processor may be a CPU, or may be an ASIC, or may be one or more integrated circuits configured to implement the method performed by the base station, for example, one or more microprocessors DSPs, or one or more field programmable gate arrays FPGAs. A storage component may be a memory, or may be a collective term for a plurality of storage components.

The memory 75 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synch link dynamic random access memory (SLDRAM), and a direct rambus random access memory (DRRAM). The memory 75 described in this application is intended to include but is not limited to these and any other suitable types of memories.

Specifically, the base station in this embodiment of this disclosure further includes a computer program stored in the memory 75 and capable of running on the processor 74. The processor 74 invokes the computer program in the memory 75 to perform the method performed by each module shown in FIG. 7.

Specifically, when being invoked by the processor 74, the computer program may be used to receive an indication message of a radio link failure reported by a first terminal, where the indication message includes at least one of the following information: an identifier of radio link, an indication of radio link failure, or a cause of the radio link failure; and The base station can implement the steps of the method for handling radio link failure applied to the base station, with the same technical effects achieved. To avoid repetition, details are not described herein again.

An embodiment of this disclosure further provides a non-transitory computer-readable storage medium. The non-transitory computer-readable storage medium stores a computer program. When the computer program is executed by a processor, the procedures of the method for handling radio link failure applied to a base station in the foregoing embodiment are implemented, with the same technical effect achieved. To avoid repetition, details are not described herein again.

A person of ordinary skill in the art may realize that units and algorithm steps of various examples described with reference to the embodiments disclosed in this specification can be implemented by using electronic hardware, or a combination of a computer software and electronic hardware. Whether the functions are performed by hardware or software depends on particular applications and design constraints of the technical solutions. A skilled person in the art may use different methods to implement the described functions for each particular application, but it should not be considered that the implementation goes beyond the scope of this disclosure.

It can be clearly understood by a skilled person in the art that, for convenient and brief description, for a detailed working process of the systems, apparatuses, and units in the foregoing description, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a base station, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method for this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any of the steps or components of the method and the apparatus in this disclosure may be implemented in any computing apparatus (including a processor, a storage medium, and the like) or a network of computing apparatuses through hardware, firmware, software, or a combination thereof. This can be implemented by a person of ordinary skill in the art who has read the descriptions of this disclosure, by using their basic programming skills.

Therefore, the objectives of this disclosure can also be implemented by running a program or a set of programs on any computing apparatus. The computing apparatus may be a general apparatus of common sense. Therefore, the objective of this disclosure may also be implemented by providing only a program product that includes program code for implementing the method or apparatus. Therefore, such program product also constitutes this disclosure, and a storage medium storing such program product also constitutes this disclosure. Apparently, the storage medium may be any storage medium of common sense or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in time sequence following the order of description, but are not necessarily performed in time sequence. Some steps may be performed in parallel or separate from each other.

The foregoing descriptions are merely optional implementations of this disclosure. It should be noted that a person of ordinary skill in the art may make several improvements or polishing without departing from the principle of the disclosure and the improvements and polishing shall fall within the protection scope of this disclosure.

What is claimed is:

1. A method for handling radio link failure, applied to a first terminal and comprising:
    detecting a radio link failure between the first terminal and a second terminal; and
    reporting an indication message of the radio link failure to a serving base station of the first terminal, wherein the indication message comprises at least one of the following information:
    an identifier of radio link;
    an indication of radio link failure; or
    a cause of the radio link failure;
    wherein before the detecting a radio link failure between the first terminal and a second terminal, the method further comprises any one of the following:
    receiving a first notification message of the second terminal, wherein the first notification message comprises information of a serving base station of the second terminal; or
    sending a second notification message to the second terminal, wherein the second notification message comprises information of the serving base station of the first terminal.

2. The method for handling radio link failure according to claim 1, further comprising:
    after the first terminal changes its serving base station, sending a third notification message to the second terminal, wherein the third notification message comprises the information of the serving base station of the first terminal.

3. The method for handling radio link failure according to claim 1, wherein
    the first notification message further comprises an identity of the second terminal and/or information of the radio link; and
    the second notification message further comprises an identity of the first terminal and/or the information of the radio link.

4. The method for handling radio link failure according to claim 3, wherein after the detecting a radio link failure between the first terminal and a second terminal, the method further comprises:
    reporting information of the second terminal to the serving base station of the first terminal, wherein the information of the second terminal comprises at least one of the following:
    the identity of the second terminal and the information of the serving base station of the second terminal; or
    the information of the radio link.

5. The method for handling radio link failure according to claim 4, wherein the information of the second terminal comprises first information about whether the second terminal is a transmit end; or
    the information of the second terminal is reported by the first terminal to the serving base station of the first terminal in a case that the second terminal is a transmit end.

6. The method for handling radio link failure according to claim 1, wherein the information of the serving base station of the first terminal comprises at least one of the following:
    a cell identifier of a primary cell of the first terminal;
    a base station identifier of the primary cell of the first terminal;
    a cell identifier of a cell on which the first terminal camps; or
    a base station identifier of the cell on which the first terminal camps; and
    the information of the serving base station of the second terminal comprises at least one of the following:
    a cell identifier of a primary cell of the second terminal; or
    a cell identifier of a cell on which the second terminal camps.

7. A non-transitory computer-readable storage medium, wherein the computer-readable storage medium stores a computer program, and when the computer program is executed by a processor, the steps of the method for handling radio link failure according to claim 1 are implemented.

8. The non-transitory computer-readable storage medium according to claim 7, wherein when the processor executes the computer program, at least one of the following is further implemented:
    receiving a first notification message of the second terminal, wherein the first notification message comprises information of a serving base station of the second terminal; or
    sending a second notification message to the second terminal, wherein the second notification message comprises information of the serving base station of the first terminal.

9. A method for handling radio link failure, applied to a first base station and comprising:
    receiving an indication message of a radio link failure between a first terminal and a second terminal reported by the first terminal, wherein the indication message comprises at least one of the following information: an identifier of radio link, an indication of radio link failure, or a cause of the radio link failure; and
    releasing a resource corresponding to the radio-link link;
    the method further comprising:
    receiving information of the second terminal reported by the first terminal, wherein the information of the second terminal comprises at least one of the following:
    an identity of the second terminal and information of a serving base station of the second terminal; or
    information of the radio link.

10. The method for handling radio link failure according to claim 9, wherein the resource corresponding to the radio link comprises at least one of the following:
    a sidelink resource pool;
    a periodically configured sidelink resource; or
    a Uu interface resource used for assisting a sidelink.

11. The method for handling radio link failure according to claim 9, wherein after the receiving an indication message of a radio link failure reported by a first terminal, the method further comprises:

sending a first indication message to a second base station to indicate a radio link failure between the second terminal and the first terminal, wherein the first indication message is used for the second base station to release the resource corresponding to the radio link, and the second base station is the serving base station of the second terminal.

12. The method for handling radio link failure according to claim 11, wherein the sending a first indication message to a second base station comprises:
sending the first indication message to the second base station through an Xn and/or X2 interface.

13. The method for handling radio link failure according to claim 11, wherein the first indication message comprises at least one of the following information:
an indication of sidelink radio link failure;
the information of the second terminal;
the identifier of radio link; or
a destination identifier of radio link.

14. The method for handling radio link failure according to claim 11, wherein
the information of the second terminal comprises first information about whether the second terminal is a transmit end; or
the information of the second terminal is reported by the first terminal in a case that the second terminal is a transmit end.

15. A communications device, comprising a processor, a memory, and a computer program stored in the memory and running on the processor, wherein when the processor executes the computer program, the steps of the method for handling radio link failure according to claim 9 are implemented.

16. A non-transitory computer-readable storage medium, wherein the computer-readable storage medium stores a computer program, and when the computer program is executed by a processor, the steps of the method for handling radio link failure according to claim 9 are implemented.

17. A communications device, comprising a processor, a memory, and a computer program stored in the memory and running on the processor, wherein when the processor executes the computer program, the following steps are implemented:
detecting a radio link failure between the first terminal and a second terminal; and
reporting an indication message of the radio link failure to a serving base station of the first terminal, wherein the indication message comprises at least one of the following information:
an identifier of radio link;
an indication of radio link failure; or
a cause of the radio link failure;
wherein when the processor executes the computer program, at least one of the following is further implemented:
receiving a first notification message of the second terminal, wherein the first notification message comprises information of a serving base station of the second terminal; or
sending a second notification message to the second terminal, wherein the second notification message comprises information of the serving base station of the first terminal.

* * * * *